US012583234B2

(12) United States Patent
Miura

(10) Patent No.: US 12,583,234 B2
(45) Date of Patent: Mar. 24, 2026

(54) PRINT HEAD WITH HANDLE

(71) Applicant: SEIKO EPSON CORPORATION, Tokyo (JP)

(72) Inventor: Masaki Miura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 165 days.

(21) Appl. No.: 18/424,938

(22) Filed: Jan. 29, 2024

(65) Prior Publication Data

US 2024/0253375 A1 Aug. 1, 2024

(30) Foreign Application Priority Data

Jan. 30, 2023 (JP) ................................ 2023-011568

(51) Int. Cl.

| | |
|---|---|
| ***B41J 3/36*** | (2006.01) |
| ***B41J 3/407*** | (2006.01) |
| ***B41J 29/377*** | (2006.01) |
| *B41J 2/14* | (2006.01) |
| *B41J 2/175* | (2006.01) |
| *B41J 3/39* | (2006.01) |

(52) U.S. Cl.

CPC ............... *B41J 3/36* (2013.01); *B41J 3/4075* (2013.01); *B41J 29/377* (2013.01); *B41J 2/14* (2013.01); *B41J 2/17503* (2013.01); *B41J 2/1752* (2013.01); *B41J 2/17536* (2013.01); *B41J 3/39* (2013.01); *B41J 3/40731* (2020.08); *B41J 2202/14* (2013.01); *B41J 2202/19* (2013.01); *B41J 2202/20* (2013.01)

(58) Field of Classification Search

CPC . B41J 3/36; B41J 3/4075; B41J 29/377; B41J 2/14; B41J 2/17503; B41J 2/1752; B41J 2/17536; B41J 3/39; B41J 3/40731; B41J 2202/14; B41J 2202/19; B41J 2202/20

See application file for complete search history.

(56) References Cited

U.S. PATENT DOCUMENTS

2006/0152561 A1* 7/2006 Belfiore ............... B41J 2/17546 347/85
2016/0297221 A1* 10/2016 Kitazawa ............... B41J 29/377
2017/0113475 A1* 4/2017 Johnson ................... B41J 29/06
2020/0130388 A1* 4/2020 Saito .......................... B41J 2/14

FOREIGN PATENT DOCUMENTS

JP H06-238883 A 8/1994

* cited by examiner

*Primary Examiner* — Henok D Legesse
(74) *Attorney, Agent, or Firm* — Spencer Fane LLP

(57) ABSTRACT

A print head that discharges a liquid includes: a nozzle plate in which a nozzle aperture through which the liquid is to be discharged in an ejection direction is formed, the nozzle plate being mounted on a liquid ejection surface; a housing that accommodates at least a portion of the nozzle plate; and a handle positioned opposite the nozzle plate in the ejection direction. The handle has a greater strength than that of the housing. At least a portion of the handle is aligned with the nozzle plate in a normal direction of the nozzle plate.

8 Claims, 7 Drawing Sheets

PRINT HEAD WITH HANDLE

The present application is based on, and claims priority from JP Application Serial Number 2023-011568, filed Jan. 30, 2023, the disclosure of which is hereby incorporated by reference herein in its entirety.

BACKGROUND

1. Technical Field

The present disclosure relates to print heads.

2. Related Art

JP-A-6-238883 discloses a print head that discharges ink. This print head has an elastic handgrip on its upper surface for the purpose of smoothly replacing this print head with another.

To place ink droplets at accurate locations, contemporary print heads have heavy weights. As a result, the technique disclosed above is no longer sufficient and needs some improvements accordingly.

SUMMARY

The present disclosure is a print head that discharges a liquid. This print head includes: a nozzle plate in which a nozzle aperture through which the liquid is to be discharged in an ejection direction is formed, the nozzle plate being mounted on a liquid ejection surface; a housing that accommodates at least a portion of the nozzle plate; and a handle positioned opposite the nozzle plate in the ejection direction. The handle has a greater strength than that of the housing. At least a portion of the handle is aligned with the nozzle plate in a normal direction of the nozzle plate.

DESCRIPTION OF EMBODIMENTS

Some embodiments of the present disclosure will be described below with reference to the accompanying drawings, which are used for illustrative purposes. It should be noted that such embodiments are not intended to narrow the scope of the present disclosure. Furthermore, not all components described below are essential.

1. Functional Configuration of Printing Apparatus with Print Head

A description will be given below of a functional configuration of a printing apparatus 1 with a print head 20 according to an embodiment of the present disclosure. This embodiment will be described on the assumption that the print head 20 is mounted in the printing apparatus 1, which may be an ink jet printer that forms a desired image on a medium. However, the application of the print head 20 is not limited to such printing apparatuses; alternatively, the print head 20 may be applied to: color material ejecting apparatuses that fabricate color filters for liquid crystal displays, for example; electrode material ejecting apparatuses that fabricate electrodes for organic electroluminescence (EL) displays, for example; bioorganic substance ejecting apparatuses that fabricate biochips; stereoscopic apparatuses that fabricate three-dimensional structures; and any other liquid ejecting apparatuses that discharge various types of liquids.

Figure 1:
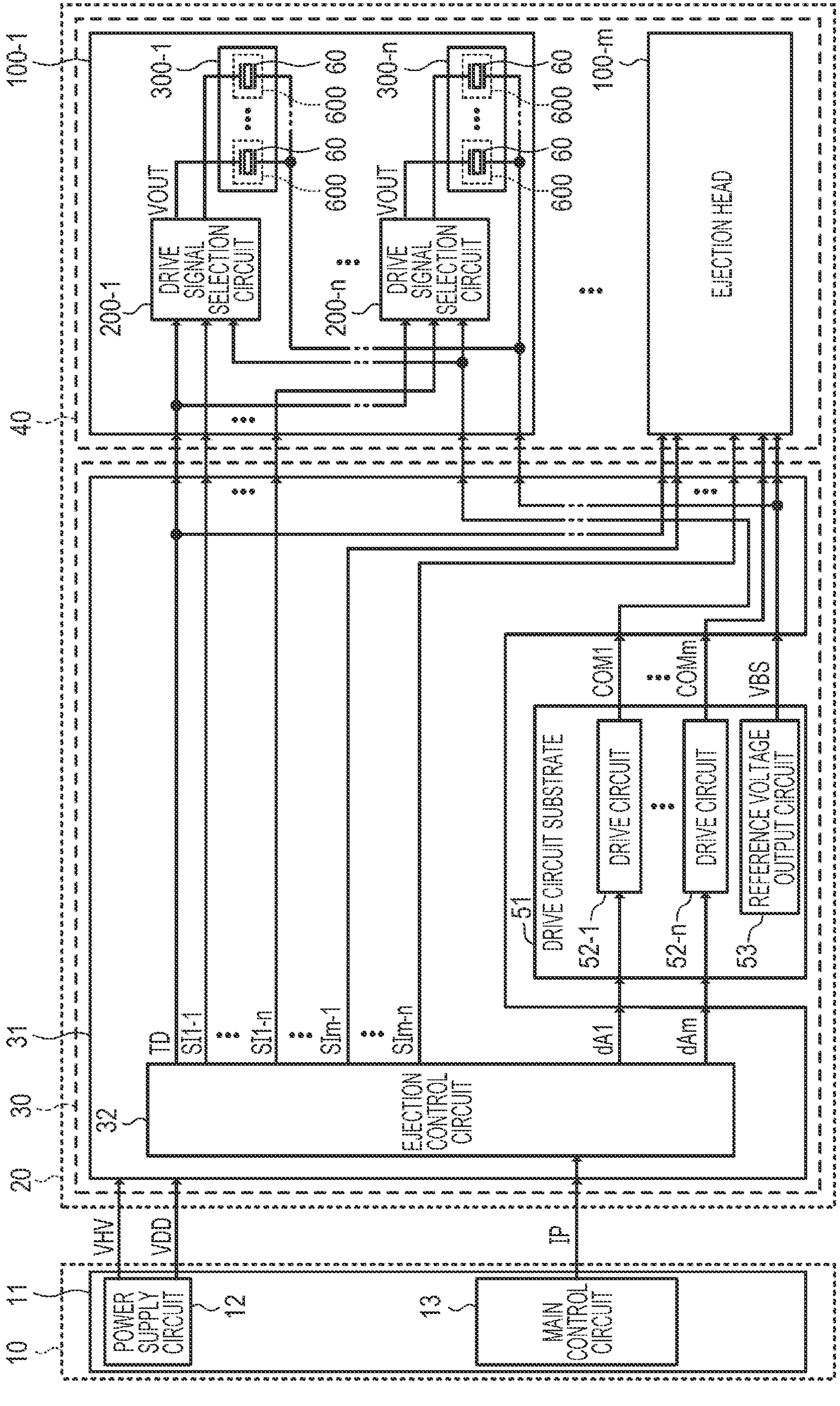
FIG. 1 is a functional block diagram of a printing apparatus with a print head according to an embodiment of the present disclosure.

FIG. 1 is a functional block diagram of the printing apparatus 1 with the print head 20. As illustrated in FIG. 1, the printing apparatus 1 includes a control mechanism 10 in addition to the print head 20.

The control mechanism 10 includes: a wiring substrate 11; and a power supply circuit 12 and a main control circuit 13, both of which are mounted on the wiring substrate 11. The control mechanism 10 generates a source voltage for use in driving the print head 20 and applies this source voltage to the print head 20. In addition, the control mechanism 10 generates a control signal for use in controlling the operation of the print head 20 and transmits this control signal to the print head 20.

The power supply circuit 12 is powered by a commercial alternating current (AC) power source (not illustrated) disposed outside the printing apparatus 1. Based on this power, the power supply circuit 12 generates some power voltages to be applied to the printing apparatus 1. Examples of such power voltages include: a voltage VHV, which is a direct current (DC) voltage of approximately 42 V; and a voltage VDD, which is a DC voltage of approximately 5 V. The power supply circuit 12 may include: an AC/DC converter, such as a flyback circuit, that converts the commercial AC voltage into a predetermined DC voltage; and a DC/DC converter that converts the DC voltage output from the AC/DC converter into another predetermined DC voltage. The power supply circuit 12 then applies the generated voltages, such as the voltages VHV and VDD, to the print head 20. The print head 20 operates by means of those voltages and discharges ink as an example of a liquid. In addition to the voltages VHV and VDD, the power supply circuit 12 may 12 may generate some other desired source voltages and may apply these voltages to the control mechanism 10, the print head 20, and other sections in the printing apparatus 1.

The main control circuit 13 receives an image signal from an external apparatus, such as a host computer, disposed outside the printing apparatus 1 via an interface circuit (not illustrated). The main control circuit 13 then generates an image information signal IP as a control signal for use in forming an image on a medium in accordance with the received image signal and transmits the image information signal IP to predetermined sections. More specifically, the main control circuit 13 subjects the received image signal to a predetermined image process and then transmits the resultant signal to the print head 20 as the image information signal IP. Examples of the image process performed by the main control circuit 13 include: a color conversion process in which the received image signal is converted into color information regarding red, green, and blue and then this color information is converted into color information regarding colors of the ink to be discharged by the printing apparatus 1; and a halftoning process in which the resultant color information is binarized. However, image processes to be performed by the main control circuit 13 are not limited to the above color conversion process and halftoning process.

Based on the received image signal, the main control circuit 13 also generates, a transport control signal for use in transporting a medium on which an image is to be formed in accordance with the received image signal and then transmits this transport signal to a transport unit 70 (described later). In this way, the main control circuit 13 controls the transport of the medium on which ink droplets discharged from the print head 20 are to be placed. The main control circuit 13 may be implemented in at least one semiconductor device, such as a System on a Chip (SoC) that performs a plurality of functions.

In the control mechanism 10, as described above, the power supply circuit 12 generates both the voltages VHV and VDD as the source voltages for use in driving the print head 20. In addition, the main control circuit 13 generates the image information signal IP for use in controlling the operation of the print head 20. The control mechanism 10 then transmits the generated voltages VHV and VDD and the image information signal IP to the print head 20, thereby causing the print head 20 to discharge the ink onto a medium.

The print head 20 includes an ejection control module 30 and an ejection module 40.

The ejection control module 30 includes: an ejection control circuit 32 mounted on an ejection control substrate 31; and drive circuits 52-1 to 52-*n* and a reference voltage output circuit 53, all of which are mounted on a drive circuit substrate 51.

When receiving the image information signal IP from the main control circuit 13, the ejection control circuit 32 generates an ejection timing signal TD and print data signals SI1-1 to SI1-*n* . . . SIm-1 to SIm-n for use in controlling the discharge of the ink from the print head 20, based on the received image information signal IP. The ejection control module 30 transmits the ejection timing signal TD and the print data signals SI1-1 to SI1-*n* . . . SIm-1 to SIm-n generated by the ejection control circuit 32 to the ejection module 40.

The ejection control circuit 32 also generates base drive signals dA1 to dAm based on the image information signal IP received from the main control circuit 13 and then transmits the base drive signals dA1 to dAm to the drive circuit substrate 51.

When the ejection control circuit 32 transmits the base drive signal dA1 to the drive circuit substrate 51, the drive circuit 52-1 mounted on the drive circuit substrate 51 receives the base drive signal dA1. The drive circuit 52-1 then converts the received base drive signal dA1 into an analog signal and amplifies this analog signal based on the voltage VHV, thereby generating a drive signal COM1. Likewise, when a drive circuit 52-*i* (i is an integer selected from 1 to m) receives a base drive signal dAi, the drive circuit 52-*i* converts the base drive signal dAi into an analog signal and then amplifies this analog signal based on the voltage VHV, thereby generating a drive signal COMi. In this case, the base drive signal dA1 is used to control the waveform of the drive signal COM1; the base drive signal dAi is used to control the waveform of the drive signal COMi. The reference voltage output circuit 53 mounted on the drive circuit substrate 51 varies the voltage VDD or VHV to generate a reference voltage signal VBS.

The drive circuit substrate 51 transmits the drive signals COM1 to COMm generated, respectively, by the drive circuits 52-1 to 52-*m* and the reference voltage signal VBS generated by the reference voltage output circuit 53 to the ejection module 40. In this case, when the drive circuit substrate 51 outputs the drive signals COM1 to COMm and the reference voltage signal VBS, the drive signals COM1 to COMm and the reference voltage signal VBS travel across the ejection control substrate 31 in the ejection control module 30 and then reaches the ejection module 40.

The ejection module 40 includes ejection heads 100-1 to 100-*m*, each of which includes: drive signal selection circuits 200-1 to 200-*n*; and head chips 300-1 to 300-*n* related, respectively, to the drive signal selection circuits 200-1 to 200-*n*.

The drive signal selection circuit 200-1 mounted in the ejection head 100-1 receives the ejection timing signal TD, the print data signal SI1-1, and the drive signal COM1. The drive signal selection circuit 200-1 in the ejection head 100-1 then selects some of the waveforms contained in the drive signal COM1 in accordance with the print data signal SI1-1 and at the timing defined by the ejection timing signal TD, thereby generating drive signals VOUT, which are related, respectively, to a plurality of ejection sections 600 in a head chip 300-1 mounted on the ejection head 100-1. The drive signal selection circuit 200-1 in the ejection head 100-1 then supplies the generated drive signals VOUT to first ends of piezoelectric elements 60 in the corresponding ejection sections 600. In this case, the reference voltage signal VBS is supplied to second ends of the piezoelectric elements 60. Each piezoelectric element 60 is driven in accordance with the potential difference between the drive signal VOUT supplied to the first end thereof and the reference voltage signal VBS supplied to the second end thereof. In response to the driving of a piezoelectric element 60, the corresponding ejection section 600 discharges the ink.

Likewise, the drive signal selection circuit 200-*n* mounted in the ejection head 100-1 receives the ejection timing signal TD, the print data signal SI1-*n*, and the drive signal COM1. The drive signal selection circuit 200-*n* in the ejection head 100-1 then selects some of the waveforms contained in the drive signal COM1 in accordance with the print data signal SI1-*n* and at the timing defined by the ejection timing signal TD, thereby generating drive signals VOUT, which are related, respectively, to a plurality of ejection sections 600 in a head chip 300-*n* mounted on the ejection head 100-1. The drive signal selection circuit 200-*n* in the ejection head 100-1 then supplies the generated drive signals VOUT to first ends of piezoelectric elements 60 in the corresponding ejection sections 600. In this case, the reference voltage signal VBS is supplied to second ends of the piezoelectric elements 60. Each piezoelectric element 60 is driven in accordance with the potential difference between the drive signal VOUT supplied to the first end thereof and the reference voltage signal VBS supplied to the second end thereof. In response to the driving of a piezoelectric element 60, the corresponding ejection section 600 discharges the ink.

The ejection head 100-1 and each of the ejection heads 100-2 to 100-*m* have substantially the same configuration and operate in substantially the same manner although they receive different signals. Therefore, the configuration and operation of the ejection heads 100-2 to 100-*m* will not be described below. When it is unnecessary to distinguish the ejection heads 100-1 to 100-*m* from one another in the following description, they will be sometimes referred to as the ejection heads 100. In this case, the ejection heads 100 receive the ejection timing signal TD, print data signals SI-1 to SI-m as the print data signals SI1-1 to SI1-*n* . . . SIm-1 to SIm-n, drive signals COM as the drive signals COM1 to COMm, and the reference voltage signal VBS. The drive signals COM are output from the drive circuits 52, which correspond to the drive circuits 52-1 to 52-*m*.

Figure 2:
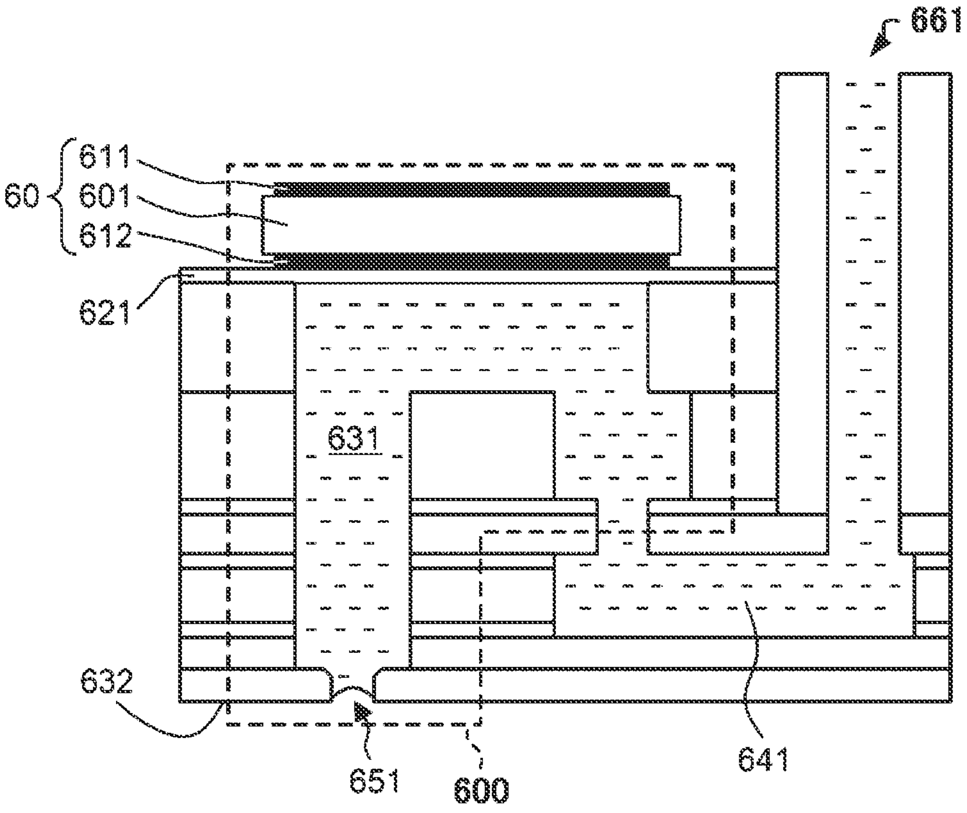
FIG. 2 schematically illustrates a structure of the ejection section.

Next, a description will be given below of a configuration of an ejection section 600, which is an arbitrary one of the ejection sections 600 mounted on the head chips 300-1 to 300-*n* in the ejection heads 100-1 to 100-*m*. FIG. 2 schematically illustrates a structure of the ejection section 600. More specifically, FIG. 2 illustrates a nozzle plate 632, a reservoir 641, and a supply port 661 in addition to the ejection section 600.

As illustrated in FIG. 2, the ejection section 600 includes the piezoelectric element 60, a vibration plate 621, a cavity 631, and a plurality of nozzles 651. The piezoelectric element 60 includes: a pair of electrodes 611 and 612; and a piezoelectric body 601 disposed between the electrodes 611 and 612. The electrode 611 is supplied with the drive signal VOUT, whereas the electrode 612 is supplied with the reference voltage signal VBS. The piezoelectric element 60 is driven in accordance with the potential difference between the drive signal VOUT supplied to the electrode 611 and the voltage applied to the electrode 612 so that the central section thereof is displaced vertically.

As illustrated in FIG. 2, the vibration plate 621 is disposed below the piezoelectric element 60. More specifically, the piezoelectric element 60 is mounted on the upper surface of the vibration plate 621 as illustrated in FIG. 2. The vibration plate 621 is displaced vertically in conjunction with the vertical displacement of the piezoelectric element 60.

As illustrated in FIG. 2, the cavity 631 is disposed below the vibration plate 621. The cavity 631 is supplied with the ink from the reservoir 641, which has been filled with the ink through the supply port 661. In short, when the ink is poured into the reservoir 641 via the supply port 661, it is stored in the cavity 631. The cavity 631 can vary its capacity in response to the vertical displacement of the vibration plate 621. In this case, the vibration plate 621 functions as a diaphragm that varies the capacity of the cavity 631, whereas the cavity 631 functions as a chamber that varies its inner pressure in response to the vertical displacement of the vibration plate 621.

Each nozzle 651 is an aperture formed across the nozzle plate 632 and leads to the cavity 631. When the capacity of the cavity 631 decreases, the ink stored in the cavity 631 is discharged therefrom through the nozzles 651 in accordance with that decrease.

In the ejection section 600 configured above, when the piezoelectric element 60 is warped upward, the vibration plate 621 is displaced upward. In response, the capacity of the cavity 631 increases, and the ink stored in the reservoir 641 thereby flows into the cavity 631. When the piezoelectric element 60 is warped downward, the vibration plate 621 is displaced downward. In response, the capacity of the cavity 631 decreases, and the ink is thereby discharged from the cavity 631 through the nozzles 651 in amount proportional to the decrease in the capacity of the cavity 631.

It should be noted the structure of the piezoelectric element 60 is not limited to that illustrated in FIG. 2. Alternatively, the piezoelectric element 60 may employ any other structure that can be driven in accordance with the drive signal VOUT and the reference voltage signal VBS to cause the ejection section 600 to discharge the ink onto a medium through the nozzles 651.

According to this embodiment, a print head 20 includes: a nozzle plate 632 with a nozzle 651 through which ink is to be discharged; and a drive circuit 52 that outputs a drive signal COM, based on which a drive signal VOUT for use in discharging the ink through the nozzle 651 is to be formed. An ejection head 100 in the print head 20 includes head chips 300-1 to 300-*n*, each of which includes a plurality of ejection sections 600. The head chips 300-1 to 300-*n* have substantially the same configuration. Therefore, when it is unnecessary to distinguish the head chips 300-1 to 300-*n* from one another in the following description, the head chips 300-1 to 300-*n* are sometimes referred to as the head chips 300.

2. Structure of Printing Apparatus

Figure 3:
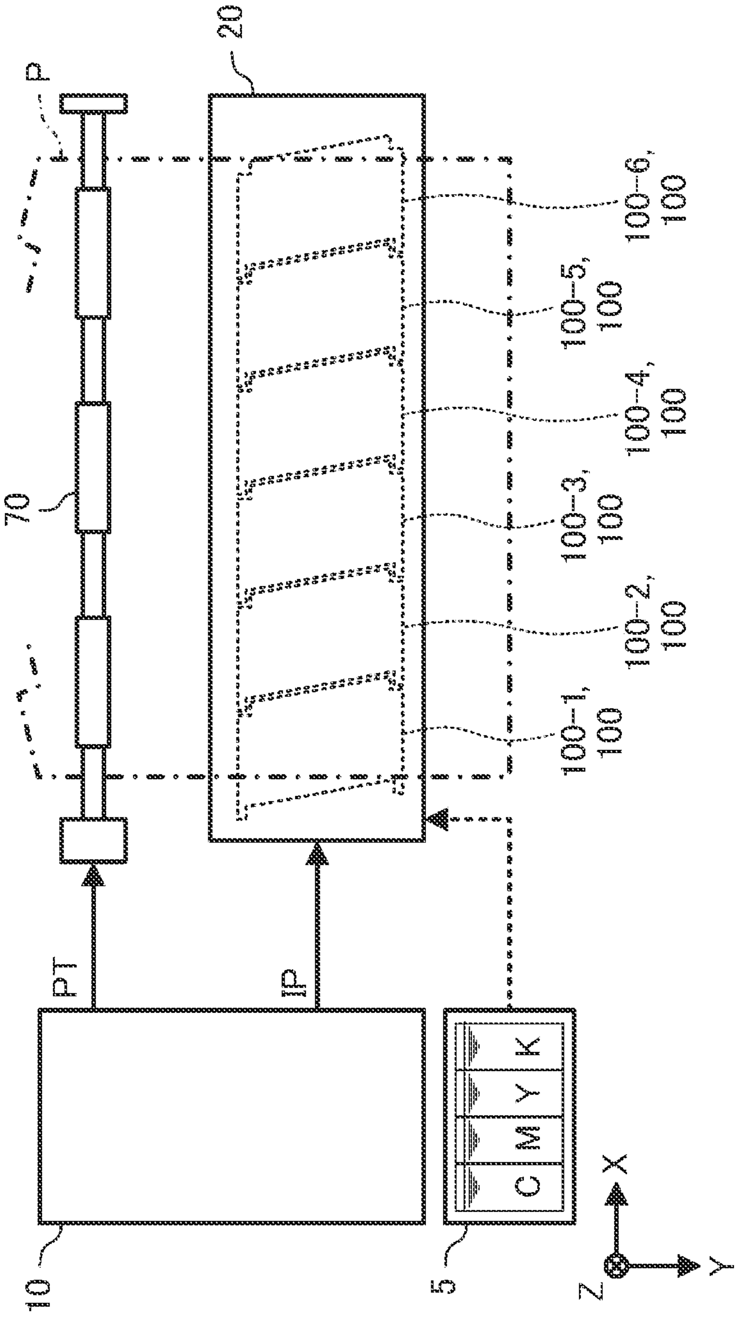
FIG. 3 schematically illustrates a structure of the printing apparatus.

A schematic structure of the printing apparatus 1 will be described below. FIG. 3 schematically illustrates a structure of the printing apparatus 1. In this case, the print head 20 includes six ejection heads 100: ejection heads 100-1 to 100-6. For the description, three space axes, more specifically, the X-, Y-, and Z-axes are illustrated and used. Moreover, the directions along each of the X-, Y-, and Z-axes are defined as follows: the direction in which the X-axis arrow points is defined as the +X direction whereas the opposite direction is defined as the −X direction; the direction in which the Y-axis arrow points is defined as the +Y direction whereas the opposite direction is defined as the −Y direction; and the direction in which the Z-axis arrow points is defined as the +Z direction whereas the opposite direction is defined as the −Z direction. It should be noted that all the components constituting the printing apparatus 1 do not necessarily have to be disposed orthogonally to one another although the X-, Y-, and Z-axes are orthogonal to one another.

As illustrated in FIG. 3, in addition to both the control mechanism 10 and the print head 20, the printing apparatus 1 includes: the transport unit 70 that transports a medium P on which ink droplets discharged from the print head 20 are to be placed; and a liquid container 5 that stores the ink to be discharged from the print head 20.

The control mechanism 10, which includes the power supply circuit 12 and the main control circuit 13 as described above, controls the operations of the printing apparatus 1 including the print head 20. In addition to both the power supply circuit 12 and the main control circuit 13, the control mechanism 10 may further include: a memory circuit that stores various information regarding the printing apparatus 1; and an interface circuit that communicates with an external apparatus, such as a host computer, disposed outside the printing apparatus 1.

The control mechanism 10 receives an image signal from an external apparatus disposed outside the printing apparatus 1. Based on this image signal, the control mechanism 10 generates a control signal PT as a control signal for use in controlling the transport of a medium P and then transmits the control signal PT to the transport unit 70. In accordance with the control signal PT, the transport unit 70 feeds the medium P from the −Y side to the +Y side along the Y-axis. In this case, the direction from the −Y side to the +Y side along the Y-axis corresponds to the transport direction of the medium P. The transport unit 70 may include: a roller (not illustrated) that transports the medium P; and a motor that rotates the roller.

The liquid container 5 stores the ink to be discharged by the print head 20. For example, the liquid container 5 independently stores four types of ink: cyan (C) ink, magenta (M) ink, yellow (Y) ink, and black (K) ink. These types of ink are supplied from the liquid container 5 to the ejection heads 100-1 to 100-6 disposed in the print head 20 through respective tubes (not illustrated), for example. It should be noted that there is no limitation on the number of containers that store the ink and are disposed in the liquid container 5. Alternatively, the liquid container 5 may store some other colored types of ink, in addition to the cyan (C) ink, the magenta (M) ink, the yellow (Y) ink, and the black (K) ink.

The ejection heads 100-1, 100-2, 100-3, 100-4, 100-5, and 100-6 are arranged side by side inside the print head 20 in this order from the −X side to the +X side along the X-axis. In this case, the ejection heads 100-1 to 100-6 are disposed in the print head 20 so that their total length along the X-axis is greater than that of the medium P to be transported. The print head 20 supplies the ink stored in the liquid container 5 to each of the ejection heads 100-1 to 100-6. In addition, the print head 20 operates in accordance with the image information signal IP received from the control mechanism 10. In this way, the print head 20 discharges ink droplets onto the medium P at desired locations. It should be noted that there is no limitation on the number of ejection heads 100 arranged in the print head 20. Alternatively, any number of ejection heads 100 other than six may be arranged in the print head 20.

In the printing apparatus 1 according to this embodiment, as described above, a control mechanism 10 generates an image information signal IP based on an image signal received from an external apparatus and then transmits the image information signal IP to a print head 20. The print head 20 then discharges ink droplets onto the medium P at the timings related to the image information signal IP received from the control mechanism 10. As a result, the ink droplets discharged from the print head 20 land over the medium P at desired locations, thereby forming a desired image on the medium P.

The description will be given below on the assumption that the printing apparatus 1 is a line print type of liquid ejecting apparatus in which a plurality of ejection heads 100 are arranged side by side so that their total width is greater than that of a medium P and discharge ink droplets onto the medium P being transported, thereby forming a desired image on the medium P. However, the printing apparatus 1 is not limited to a line print type of liquid ejecting apparatus. Alternatively, the printing apparatus 1 may be a serial type of liquid ejecting apparatus in which a print head 20 is mounted on a carriage movable in scanning directions and discharges ink droplets onto a medium P at desired locations while the carriage is moving in relation to the transport of the medium P.

3. Structure of Print Head

Figure 4:
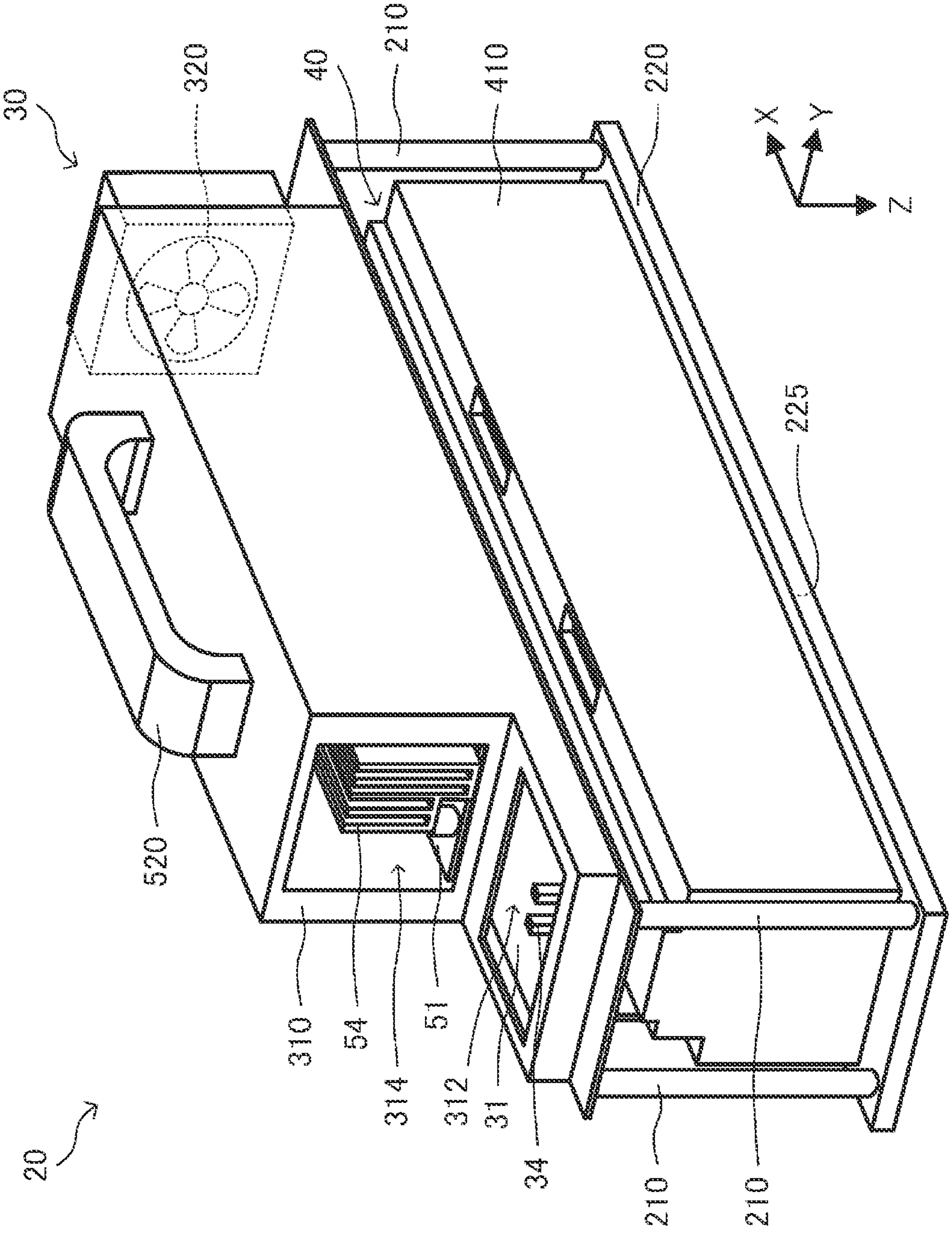
FIG. 4 is a perspective view of an example of a structure of the print head.
Figure 5:
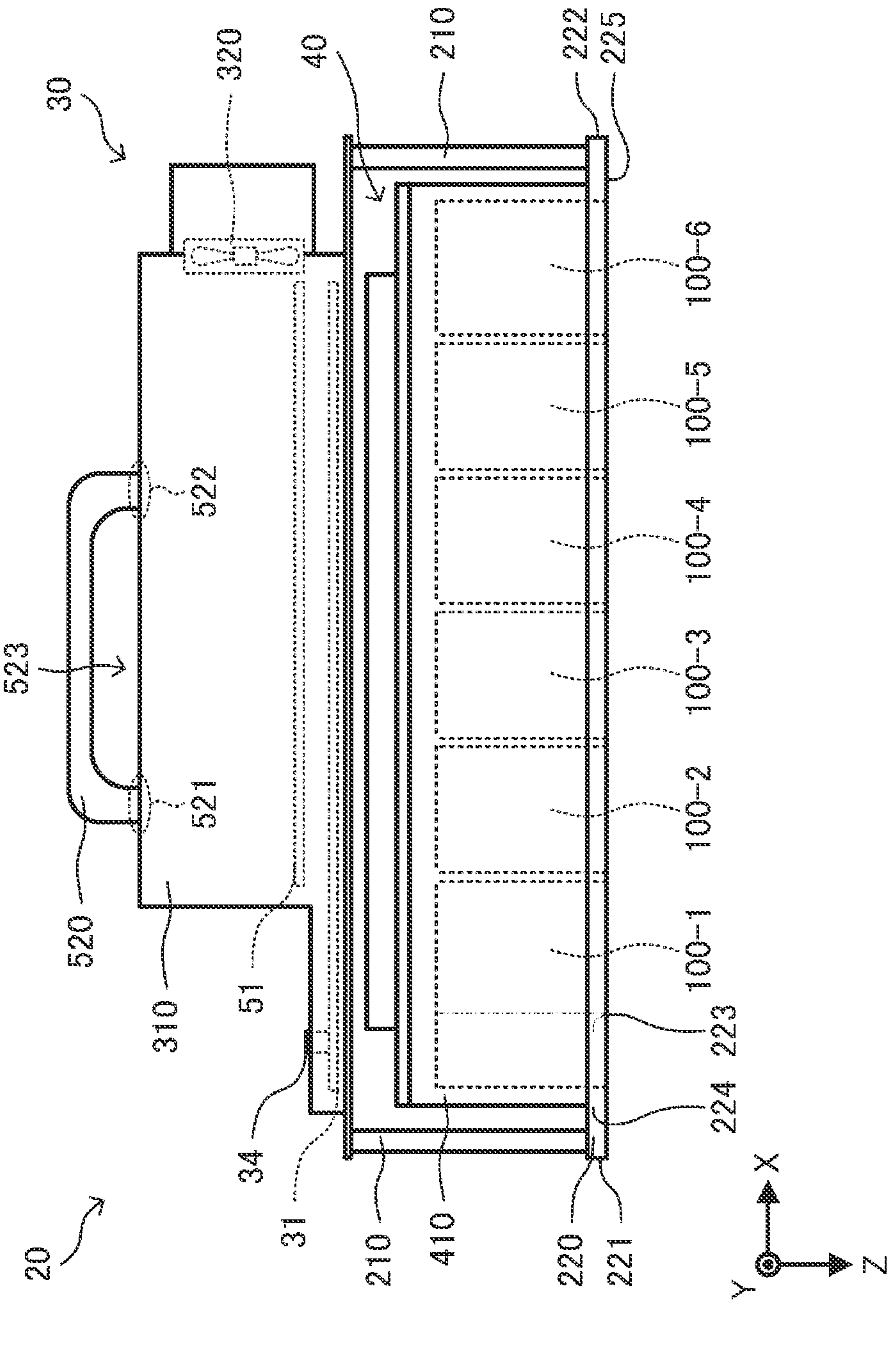
FIG. 5 is a side view of an example of the structure of the print head.

A structure of the print head 20 will be described below in detail. FIG. 4 is a perspective view of an example of the structure of the print head 20; FIG. 5 is a side view of an example of the structure of the print head 20 along the Y-axis. In FIG. 5, some of the components disposed inside the print head 20 are illustrated by broken lines.

With an improved quality of images formed on media by print heads and an increased speed of ink discharged therefrom, an increasing number of nozzles are provided in print heads. Contemporary print heads therefore tend to have large sizes and heavy weights. Moreover, to discharge ink droplets at accurate locations, some print heads have drive circuits therein that output drive signals COM, like the print head 20 according to this embodiment. This structure of print heads makes it possible to shorten the paths for the drive signals, thereby successfully discharging ink droplets at accurate locations because the waveforms of the drive signals are less likely to be distorted. If a plurality of drive circuits are mounted in a print head, this print head tends to have a larger size and a heavier weight, in which case its weight may become 5 kg or more.

The increased size and weight of print heads, as described above, may result in heavy burdens on operators involved in manufacturing liquid ejecting apparatuses, such as printing apparatuses with print heads, and also in maintaining print heads as by replacing them. Moreover, because of its size and weight, a print head is likely to accidentally come into contact with some external components, for example, in a liquid ejecting apparatus, such as a printing apparatus with a print head, during the manufacturing of the liquid ejecting apparatus or the replacing of the print head with another. If a print head accidentally comes into contact with an external component, this print head may malfunction. In addition, the nozzle plate of the print head which has nozzles through which ink is to be discharged from the print head may be damaged or scratched, especially when the nozzle plate accidentally comes into contact with an external component. In such cases, the print head might discharge different sizes of ink droplets in different directions through the nozzles in the nozzle plate, thereby discharging ink droplets at inaccurate locations.

In consideration of the above disadvantages, there is a demand for a print head that is stably attachable/detachable to or from a liquid ejecting apparatus, regardless of its size and weight. In addition, this print head is less likely to accidentally come into contact with an external component, and its nozzle plate is less likely to be damaged or scratched. To satisfy this demand, a print head 20 according to this embodiment which discharges ink includes: a nozzle plate 632 which is mounted on an ink ejection surface 225 and in which a nozzle 651 through ink is to be discharged in the −Z side to the +Z side along the Z-axis is formed; a housing 410 that accommodates at least a portion of the nozzle plate 632; and a handle 520 positioned on the −Z side with respect to the nozzle plate 632, namely, on the side opposite to the +Z side. The handle 520 has a greater strength than that of the housing 410. At least a portion of the handle 520 is aligned with the nozzle plate 632 in a normal direction of the nozzle plate 632, namely, in a direction along the Z-axis.

In the print head 20 configured above, the strength of the handle 520 is greater than that of the housing 410. Thus, even when a user pulls up strongly, the handle 520 is less likely to be deformed. In addition, when the user lifts up with the handle 520, the print head 20 is less likely to wiggle and accordingly to accidentally come into contact with an external component. More specifically, the nozzle plate 632 mounted in the print head 20 is less likely to wiggle and accordingly to accidentally come into contact with an external component. This structure successfully reduces the risk of the nozzle plate 632 being damaged or scratched and also the risk of the print head 20 discharging ink droplets at inaccurate locations, regardless of a size and weight of the print head 20.

At least a portion of the handle 520 is aligned with the nozzle plate 632 in a normal direction of the nozzle plate 632, namely, in a direction along the Z-axis. In this case, by pulling up the handle 520 with the print head 20 kept in a substantially horizontal position, the print head 20 can be lifted up with the nozzle plate 632 kept in a substantially horizontal position, regardless of a size and weight of the print head 20. This structure successfully further reduces the risk of the nozzle plate 632 accidentally coming into contact with an external component and also the risk of the nozzle plate 632 being damaged or scratched. It is consequently possible to further reduce the risk of the print head 20 discharging ink droplets at inaccurate locations, regardless of a size and weight of the print head 20.

A concrete example of the structure of the print head 20 will be described below. The print head 20 according to this embodiment has a large size and a heavy weight. More specifically, the length of the print head 20 along the X-axis may be approximately 440 mm, which is greater than that of a short side of an A3-size sheet. The length of the print head 20 along the Y-axis may be approximately 90 mm. The length of the print head 20 along the Z-axis except that of the handle 520 may be approximately 200 mm. The weight of the print head 20 may 20 may be 5 kg or more. As illustrated in FIG. 4, the print head 20 includes a fixture plate 220, the ejection control module 30, the ejection module 40, and the handle 520.

The fixture plate 220, which is a planar member expanding in the X-Y plane defined by the X- and Y-axes, supports both the ejection module 40 and the ejection control module 30. The fixture plate 220 has, on its +Z side, an ink ejection surface 225 from which the ink is to be discharged from the −Z side to the +Z side along the Z-axis.

The ejection module 40 is positioned on the −Z side with respect to the fixture plate 220 and fixed to the −Z-side surface of the fixture plate 220. As described above, the ejection module 40 incudes a housing 410 and ejection heads 100-1 to 100-6. As illustrated in FIG. 5, the housing 410 accommodates the ejection heads 100-1 to 100-6 and functions as a protection member that protects the ejection heads 100-1 to 100-6 from external shock and ink mist. The housing 410 may be made of aluminum, iron, or some other metal material. However, the housing 410 may be made of any material that can protect the ejection heads 100-1 to 100-6 from external shock and ink mist; alternatively, the housing 410 may be made of a resin material.

The ejection heads 100-1, 100-2, 100-3, 100-4, 100-5, and 100-6 are arranged side by side inside the housing 410 in this order from the −X side to the +X side along the X-axis. In this case, each of the ejection heads 100-1 to 100-6 is at least partly exposed from the ink ejection surface 225, which corresponds to the +Z-side surface of the fixture plate 220, to the outside.

Figure 6:
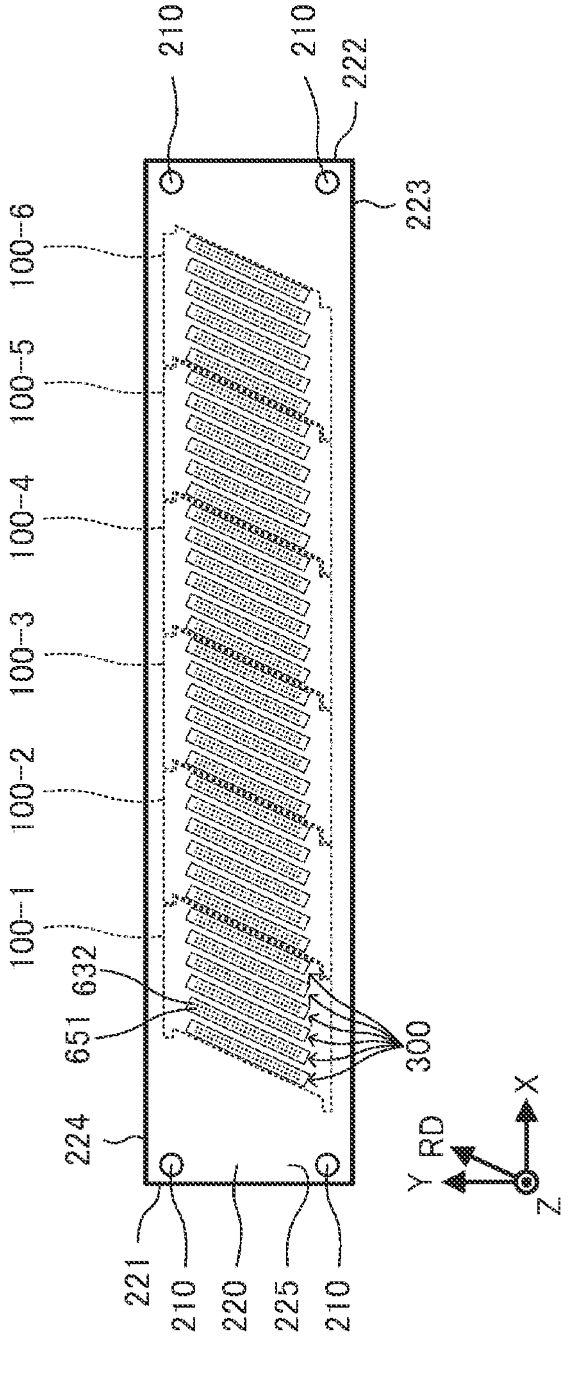
FIG. 6 illustrates an example of a configuration of the ink ejection surface.

FIG. 6 illustrates an example of a configuration of the ink ejection surface 225. In the following description, each of the ejection heads 100-1 to 100-6 has six head chips 300.

As illustrated in FIG. 6, the fixture plate 220 has four sides: sides 221, 222, 223, and 224, the sides 221 and 222 being shorter than the sides 223 and 224. The side 221 extends along the Y-axis; the side 222 is positioned on the +X side with respect to the side 221 and extends along the Y-axis in parallel with the side 221; the side 223 extends along the X-axis and intersects both the sides 221 and 222; and the side 224 is positioned on the +Y side with respect to the side 223, intersects both the sides 221 and 222, and extends along the X-axis in parallel with the side 222. In short, as viewed from the normal direction of the ink ejection surface 225, namely, from the +Z side along the Z-axis, the fixture plate 220 is a substantially rectangular shape formed of the sides 221, 222, 223, and 224, the sides 221 and 222 being shorter than the sides 223 and 224. In other words, the ink ejection surface 225 of the fixture plate 220 has the sides 221, 222, 223, and 224. In this case, the sides 223 and 224 are longer than the sides 221 and 222 and each intersect both sides 221 and 222 as viewed along the Z-axis. It should be noted that the shape of the fixture plate 220 and the ink ejection surface 225 as viewed along the Z-axis is not limited to a substantially rectangular shape.

Each of the ejection heads 100-1 to 100-6 has six head chips 300, each of which is provided with a nozzle plate 632 exposed from the ink ejection surface 225 of the fixture plate 220 to the outside.

The six head chips 300 that are disposed in each of the ejection heads 100-1 to 100-6 each have a plurality of nozzles 651 corresponding to the ejection sections 600 formed in the nozzle plate 632. Each head chip 300 is provided with the ejection sections 600 having nozzles 651. The nozzles 651 are arrayed in a plurality of rows along a nozzle line RD, which extends within the X-Y plane defined by the X- and Y-axes in a direction vertical to the Z-axis and angled with respect to both the X- and Y-axes. In this case, the plurality of nozzles 651 in each head chip 300 are arrayed in rows along the nozzle line RD, thereby forming a plurality of nozzle rows. In addition, the nozzle plates 632 in each head chip 300 which are provided with the nozzles 651 also extend in the nozzle line RD, in which the nozzle rows each of which is formed of a predetermined number of nozzles 651 extend. The six head chips 300 disposed in each of the ejection heads 100-1 to 100-6 are arranged side by side along the X-axis. In this case, the six nozzle plates 632 are disposed on the respective head chips 300 in each of the ejection heads 100, which are arranged on the ink ejection surface 225 of a fixture plate 220 in the print head 20. The nozzle plates 632 are arranged side by side along the X-axis while extending in the nozzle line RD. In other words, the nozzle plates 632 each of which has a plurality of nozzle rows are arranged side by side along the X-axis on the ink ejection surface 225 of the fixture plate 220 in the print head 20 while extending along the nozzle line RD. All the nozzle plates 632 are exposed from the ink ejection surface 225 to the outside. It should be noted that there is no limitation on the number of head chips 300 disposed in each of the ejection heads 100-1 to 100-6.

As illustrated in FIG. 4, the ejection control module 30 is positioned on the −Z side with respect to the ejection module 40. The ejection control module 30 is fixed to the fixture plate 220 while supported by a plurality of support members 210. The ejection control module 30 includes a housing 310, a cooling fan 320, the ejection control substrate 31 as described above, and the drive circuit substrate 51.

As illustrated in FIG. 5, the housing 310 accommodates the ejection control substrate 31, the drive circuit substrate 51, and the cooling fan 320. The housing 310 functions as a protection member that protects the ejection control substrate 31, the drive circuit substrate 51, and the cooling fan 320 from external shock and ink mist. The housing 310 may be made of aluminum, iron, or some other metal material. However, the housing 310 may be made of any material that can protect the ejection control substrate 31, the drive circuit substrate 51, and the cooling fan 320 from external shock and ink mist; alternatively, the housing 310 may be made of a resin material.

The ejection control substrate 31 is provided with a connector 34. The connector 34 is mounted on the −Z-side surface of the ejection control substrate 31 and positioned near the −X edge of the ejection control substrate 31. In addition, the connector 34 is exposed from the print head 20 to the outside via an aperture 312 of the housing 310. The connector 34 is to be coupled to a cable (not illustrated) by which the ejection control substrate 31 is electrically connected to the wiring substrate 11 in the control mechanism 10. Through this cable, the ejection control substrate 31 is supplied with the voltages VHV and VDD applied by the power supply circuit 12 and the image information signal IP output from the main control circuit 13, both of which are mounted on the wiring substrate 11 in the control mechanism 10. In short, the connector 34 via which the control signals for use in controlling the operation of the print head 20, namely, the voltages VHV and VDD and the image information signal IP are supplied to the ejection control substrate 31 is mounted on the ejection control substrate 31. In other words, the print head 20 is provided with the connector 34 via which the control signals for use in controlling the operation of the print head 20, namely, the voltages VHV and VDD and the image information signal IP are supplied to the ejection control substrate 31.

The drive circuit substrate 51 is positioned on the −Z side with respect to the ejection control substrate 31 while accommodated in the housing 310. The drive circuit substrate 51 is electrically connected to the ejection control substrate 31, for example, by a Board-to-Board (B-to-B) connector (not illustrated). Instead of a B-to-B connector, the drive circuit substrate 51 may be electrically connected to the ejection control substrate 31 by a flexible printed circuit (FPC) cable or a flexible flat cable (FFC).

A radiation fin 54 is mounted on the −Z-side surface of the drive circuit substrate 51. As described above, the drive circuits 52-1 to 52-6 and the reference voltage output circuit 53 are mounted on the drive circuit substrate 51. At least a portion of the radiation fin 54 is kept in contact with the electronic components of the drive circuits 52-1 to 52-6 and the reference voltage output circuit 53. The radiation fin 54 thereby can radiate heat generated by the drive circuits 52-1 to 52-6 and the reference voltage output circuit 53.

The cooling fan 320 is positioned at the +X edge of the drive circuit substrate 51 and produces an airflow in a direction along the X-axis. More specifically, the cooling fan 320 produces the airflow toward the drive circuit substrate 51. This airflow is effective in cooling down the drive circuits 52-1 to 52-6 mounted on the drive circuit substrate 51. In short, the print head 20 is provided with the cooling fan 320 that cools down the drive circuits 52-1 to 52-6. The housing 310 has an aperture 314 positioned near the −X edge of the drive circuit substrate 51 so as to face the cooling fan 320 along the X-axis. In this case, the airflow that has been created by the cooling fan 320 is output from the interior of the housing 310 to the outside via the aperture 314. As a result, the air is effectively circulated inside the housing 310, thereby efficiently cooling down the drive circuits 52-1 to 52-6.

The handle 520 is positioned on the −Z side with respect to the ejection control module 30. More specifically, the handle 520 is fixed to the −Z-side surface of the ejection control module 30. In this case, the ejection module 40, the ejection control module 30, and the handle 520 which constitute the print head 20 are arranged in this order from the +Z side to the −Z side along the Z-axis. Further, at least a portion of the ejection control module 30, namely, at least some of the drive circuits 52 mounted on the drive circuit substrate 51 in the ejection control module 30 is positioned, in a direction along the Z-axis, between the handle 520 and the nozzle plate 632 included in each of the head chips 300 that the ejection heads 100 mounted in the ejection module 40 have.

The handle 520 is misaligned from each of the cooling fan 320 and the connector 34 in a direction along the Z-axis. More specifically, the cooling fan 320 is misaligned from the handle 520 in a normal direction of the nozzle plate 632 included in each of the head chips 300 that the ejection heads 100 mounted in the ejection module 40 have, namely, in a direction along the Z-axis. Also, the connector 34 is misaligned from the handle 520 in a normal direction of the nozzle plate 632 included in each of the head chips 300 that the ejection heads 100 mounted in the ejection module 40 have, namely, in a direction along the Z-axis. Furthermore, the handle 520 is positioned between the connector 34 and the cooling fan 320 in a direction along the Z-axis. This structure, when a user lifts up the printing apparatus 1 for the purpose of replacing the print head 20 with another by pulling up the print head 20, successfully reduces the risk of the connector 34 or the cooling fan interfering with the user's operation, regardless of a size and weight of the print head 20. Thus, the structure enables the user to stably lift up the print head 20. It is consequently possible to further reduce the risk of the nozzle plates 632 accidentally coming into contact with an external component and being damaged or scratched.

Figure 7:
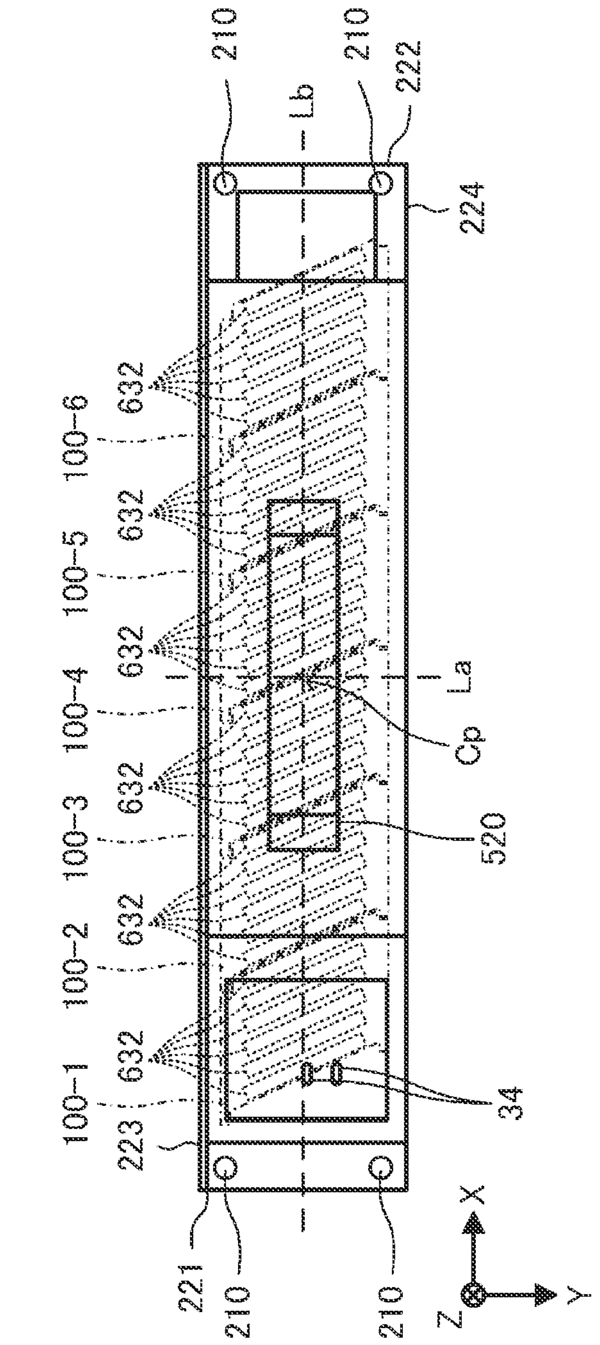
FIG. 7 is a plan view of the print head as viewed from the negative side on the Z-axis.

FIG. 7 is a plan view of the print head 20 as viewed from the −Z side along the Z-axis. In FIG. 7, the ejection heads 100-1 to 100-6 in the print head 20 and the head chips 300 in each of the ejection heads 100-1 to 100-6 are illustrated by the broken lines.

As illustrated in FIG. 7, at least a portion of the handle 520 is aligned with some of the nozzle plates 632 in a normal direction of the nozzle plate 632 included in each of the head chips 300 that ejection heads 100 mounted in the ejection module 40 have, namely, in a direction along the Z-axis. In this case, the handle 520 does not necessarily have to be aligned, in a direction along the Z-axis, with all the nozzle plates 632 included in the head chips 300 that each of the ejection heads 100-1 to 100-6 mounted in the ejection module 40 has. The handle 520 has only to be aligned with some of the nozzle plates 632 on the respective head chips 300 in a direction along the Z-axis. This structure enables the user to lift up the print head 20 with each nozzle plate 632 kept in a substantially horizontal position by pulling up the handle 520 in such a way that the print head 20 is kept in a substantially horizontal position. In this way, the structure can further reduce the risk of the nozzle plates 632 accidentally coming into contact with an external component and also the nozzle plates 632 being damaged or scratched. It is consequently possible to further reduce the risk of the print head 20 discharging ink droplets at inaccurate locations.

As illustrated in FIG. 7, the handle 520 may be aligned with a center of the print head 20 in a normal direction of the nozzle plate 632 included in each of the head chips 300 that the ejection heads 100 mounted in the ejection module 40 have, namely, in a direction along the Z-axis. More specifically, as viewed along the Z-axis, at least a portion of the handle 520 may be aligned with the center of the print head 20, in other words, with an intersection point Cp at which an imaginary line La intersects an imaginary line Lb. The imaginary line La corresponds to a line positioned substantially the same distance apart from the sides 221 and 222 of the fixture plate 220 on the ±X sides, whereas the imaginary line Lb corresponds to a line positioned substantially the same distance apart from the sides 223 and 224 of the fixture plate 220 on the ±Y sides. In this case, when the user lifts up the print head 20, the center of gravity of the print head 20 is positioned near the handle 520. As a result, the user can further stably lift up the print head 20 using the handle 520. This structure successfully further reduces the risk of the print head 20, especially the nozzle plates 632 accidentally coming into contact with an external component and also the risk of the nozzle plates 632 being damaged or scratched. It is consequently possible to further reduce the risk of the print head 20 discharging ink droplets at inaccurate locations.

As illustrated in FIGS. 4 and 5, the handle 520 has a substantially U shape when the print head 20 is viewed along the Y-axis. A first end of the handle 520 is fixed to the ejection control module 30 at a joint 521, whereas a second end of the handle 520 is also fixed to the ejection control module 30 at a joint 522. The joint 522 is positioned closer to the +X side of the print head 20 than the joint 521 is. Both joints 521 and 522 are arranged on the same line extending along the Y-axis. In this case, the handle 520 is fixed to the ejection control module 30 in such a way that the distance between the joints 521 and 522 becomes longer than any of the lengths of the joints 521 and 522 along the Y-axis. In short, the print head 20 has a substantially rectangular shape in which the length of the handle 520 along the X-axis is longer than that along the Y-axis as viewed from the −Z side along the Z-axis. In other words, when the print head 20 is viewed in a normal direction of the ink ejection surface 225, namely, along the Z-axis, the length of the handle 520 along the side 221 is shorter than that along the side 223. It should be noted that the shape of the handle 520 as viewed along the Z-axis is not limited to a rectangular one; alternatively, the shape of the handle 520 may be an oval one. Examples of such an oval shape include a rectangular shape with rounded corners, a rectangular shape with rounded short sides, an ellipsoidal shape, and an egg shape.

The print head 20 may be designed such that the handle 520 can be held by both the hands of a user for the printing apparatus 1 or an operator who replaces the print head 20 with another. For that purpose, the handle 520 may be fixed to the ejection control module 30 at the joints 521 and 522 so that the distance between the joints 521 and 522, namely, the size of a space 523 along the Y-axis becomes twice or more as large as a typical width of a human hand and that the size of the space 523 along the Z-axis becomes larger than a typical thickness of human fingers. As an example, the size of the space 523 along the Y-axis is 200 mm or more, and the size of the space 523 along the Z-axis is 20 mm or more.

It should be noted that there is no limitation on the size of the space 523 reserved when the handle 520 is fixed to the ejection control module 30; the space 523 may have any size as long as a user can hold the handle 520 with both the hands. Therefore, the size of the space 523 may be optimized depending on the country or region where liquid ejecting apparatuses equipped with the print head 20 are used and the typical age and gender of users for liquid ejecting apparatuses equipped with the print head 20.

Since the handle 520 is fixed to the ejection control module 30 in such a way that it can be held by user's hands, the user can stably lift up the print head 20, regardless of its size and weight. This structure successfully further reduces the risk of the nozzle plates 632 coming into contact with an external component and also the risk of the nozzle plates 632 being damaged or scratched. It is consequently possible to further reduce the risk of the print head 20 discharging ink droplets at inaccurate locations.

The handle 520 may be made of aluminum, iron, or some other metal material. In this case, the strength of the handle 520 may be greater than any of those of the housings 310 and 410. As a result, the user can stably lift up the print head 20, regardless of its size and weight. This structure successfully further reduces the risk of the nozzle plates 632 accidentally coming into contact with an external component and also the risk of the nozzle plates 632 being damaged or scratched.

If the strength of the handle 520 is greater than any of those of the housings 310 and 410, the strength of a material used for the handle 520 may be greater than any of those of materials used for the housings 310 and 410. However, all of the handle 520 and the housings 310 and 410 do not necessarily have to be made of different materials. Alternatively, the handle 520 and the housings 310 and 410 may be made of the same material, and the handle 520 may be structured so that its strength becomes greater than any of those of the housings 310 and 410. As an example, the handle 520 has a larger thickness than any of those of housings 310 and 410. The strengths of the handle 520 and the housings 310 and 410 may be defined as the resistances of the handle 520 and the housings 310 and 410 to deformation. Examples of the strengths of the handle 520 and the housings 310 and 410 include tensile and impact strengths of the handle 520 and the housings 310 and 410.

In this embodiment, the ink ejection surface 225 of the fixture plate 220 corresponds to an example of the liquid ejection surface. The nozzles 651 formed in each nozzle plate 632 correspond to an example of a nozzle aperture. A direction along the Z-axis, more specifically, the direction from the −Z side to the +Z side corresponds to an example of an ejection direction. The housing 410 that accommodates at least a portion of each nozzle plate 632 corresponds to an example of a housing. The sides 221 and 222 of the ink ejection surface 225 of the fixture plate 220 correspond to an example of a first side. The sides 223 and 224 of the ink ejection surface 225 of the fixture plate 220 correspond to an example of a second side. The drive signal COM and the drive signal VOUT based on the drive signal COM correspond to an example of a drive signal. The drive circuit 52 that outputs the drive signal COM corresponds to an example of a drive circuit. The cooling fan 320 that cools down the drive circuit 52 corresponds to an example of a cooling unit.

4. Function and Effect

According to an embodiment of the present disclosure, as described above, a print head 20 is designed such that a handle 520 is hard to the extent that its strength is greater than that of a housing 410. Thus, even if a user strongly pushes up the handle 520, the handle 520 is less likely to be deformed. Furthermore, when the user lifts up the print head 20 by using the handle 520, the print head 20 is less likely to wiggle and accordingly to accidentally come into contact with an external component. More specifically, a nozzle plate 632 in the print head 20 is less likely to wiggle and to accidentally come into contact with an external component. This configuration therefore successfully reduces the risk of the nozzle plate 632 being damaged or scratched. It is consequently possible to reduce the risk of the print head 20 discharging ink droplets at inaccurate locations, regardless of a size and weight of the print head 20.

In the print head 20 according to this embodiment, at least a portion of the handle 520 may be aligned with the nozzle plate 632 in a normal direction of the nozzle plate 632, namely, in a direction along the Z-axis. Thus, by pushing up the handle 520 with the print head 20 kept in a substantially horizontal position, the print head 20 can be lifted up with the nozzle plate 632 kept in a substantially horizontal position, regardless of a size and weight of the print head 20. This structure successfully further reduces the risk of the nozzle plate 632 accidentally coming into contact with an external component and also the risk of the nozzle plate 632 being damaged or scratched. It is consequently possible to further reduce the risk of the print head 20 discharging ink droplets at inaccurate locations, regardless of a size and weight of the print head 20.

In the print head 20 according to this embodiment, an ink ejection surface 225 provided with the nozzle plate 632 may have a side 221 and a side 223, the side 223 being longer than the side 221. A length of the handle 520 along the side 221 is shorter than that of the handle 520 along the side 223 when the print head 20 is viewed in a normal direction of the ink ejection surface 225, namely, along the Z-axis. In this case, the handle 520 extends in a longitudinal direction of the print head 20. This structure enables a user to further stably lift up the print head 20 by using the handle 520. In addition, the structure successfully further reduces the risk of the print head 20, especially the nozzle plate 632 accidentally coming into contact with an external component and also the risk of the nozzle plate 632 being damaged or scratched. It is consequently possible to further reduce the risk of the print head 20 discharging ink droplets at inaccurate locations, regardless of a size and weight of the print head 20.

In the print head 20 according to this embodiment, at least a portion of an ejection control module 30, more specifically, at least a portion of a drive circuit 52 mounted on a drive circuit substrate 51 in the ejection control module 30 may be positioned, in a direction along the Z-axis, between the handle 520 and a nozzle plate 632 included in a head chip 300 that an ejection head 100 mounted in an ejection module 40 has. This structure enables the user to lift up the print head 20 together with the ejection control module 30 including the drive circuit 52 when a user replaces the print head 20 with another, thereby achieving an efficient replacement process for the print head 20.

In the print head 20 according to this embodiment, a cooling fan 320 may be misaligned from the handle 520 in a normal direction of the nozzle plate 632 included in the head chip 300 that the ejection head 100 mounted in the ejection module 40 has, namely, in a direction along the Z-axis. Likewise, a connector 34 is misaligned from the handle 520 in a normal direction of the nozzle plate 632 included in the head chip 300 that the ejection head 100 mounted in the ejection module 40 has, namely, in a direction along the Z-axis. This structure, when a user lifts up the print head 20, successfully reduces the risk of the connector 34 or the cooling fan 320 interfering with the user's operation, thereby enabling the user to further stably lift up the print head 20. It is consequently possible to further reduce the risk of the nozzle plate 632 accidentally coming into contact with an external component and also the risk of the nozzle plate 632 being damaged or scratched.

In the print head 20 according to this embodiment, the handle 520 may be fixed to the ejection control module 30 in such a way that the handle 520 can be held by both hands. This structure enables a user to further stably lift up the print head 20, regardless of a size and weight of the print head 20. In addition, the structure successfully further reduces the risk of the nozzle plate 632 accidentally coming into contact with an external component and also the risk of the nozzle plate 632 being damaged or scratched. It is consequently possible to further reduce the risk of the print head 20 discharging ink droplets at inaccurate locations.

In the print head 20 according to this embodiment, at least a portion of the handle 520 is aligned with a center of the print head 20 in a normal direction of the nozzle plate 632 included in the head chip 300 that the ejection head 100 mounted in the ejection module 40 has, namely, in a direction along the Z-axis. In this case, when a user lifts up the print head 20, the center of gravity of the print head 20 is positioned near the handle 520. As a result, he/she can further stably lift up the print head 20 by using the handle 520. This structure successfully further reduces the risk of the nozzle plate 632 accidentally coming into contact with an external component and also the risk of the nozzle plate 632 being damaged or scratched. It is consequently possible to further reduce the risk of the print head 20 discharging ink droplets at inaccurate locations.

According to this embodiment, when a user lifts up a print head 20 by using a handle 520, the print head 20 and a nozzle plate 632 are less likely to accidentally come into contact with an external component, and thus the nozzle plate 632 is less likely to be damaged or scratched. Therefore, the print head 20 is less likely to discharge ink droplets at inaccurate locations even if the print head 20 has a weight of 5 kg or more.

5. Modification

A print head 20 according to the foregoing embodiment includes an ejection control module 30 and an ejection module 40. The ejection control module 30 includes a housing 310 that protects an ejection control substrate 31 and a drive circuit substrate 51. The ejection module 40 includes a housing 410 that protects ejection heads 100-1 to 100-6. However, both the ejection control module 30 and the ejection module 40 may share a single housing. More specifically, in addition to/instead of the housings 310 and 410, the print head 20 may include a housing that accommodates and protects various components constituting the print head 20, including the ejection control substrate 31, the drive circuit substrate 51, and the ejection heads 100-1 to 100-6.

The above structure can also produce the same functions and effects as those described above.

Some embodiments of the present disclosure and some modifications thereof have been described; however, the present disclosure is not limited to such embodiments and modifications and may be implemented in various aspects unless it departs from the spirit. For example, some of the components described in the embodiments and modifications may be combined together as appropriate.

Components and structures that are substantially the same as those described in the foregoing embodiments and modifications also fall within the scope of the present disclosure. Examples of such components and structures include those that have the same functions, perform the same methods, and accomplish the same objects and results as those described in the foregoing embodiments and modifications. Some embodiments conceived of by replacing nonessential components described in the embodiments and modifications with others also fall within the scope of the present disclosure. Some components and structures that produce substantially the same functions and effects and accomplish substantially the same objects as those described in such embodiments and modifications also fall within the scope of the present disclosure. Some structure that includes, in addition to the components described in the embodiments and modifications, some known techniques also fall within the scope of the present disclosure.

Some technical features that can be derived from the foregoing embodiments and modifications will be described below.

According to a first aspect of the present disclosure, a print head that discharges a liquid includes: a nozzle plate in which a nozzle aperture through which the liquid is to be discharged in an ejection direction is formed, the nozzle plate being mounted on a liquid ejection surface; a housing that accommodates at least a portion of the nozzle plate; and a handle positioned opposite the nozzle plate in the ejection direction. The handle has a greater strength than that of the housing. At least a portion of the handle is aligned with the nozzle plate in a normal direction of the nozzle plate.

The print head is designed such that the handle is hard to the extent that its strength is greater than that of the housing. Thus, even if a user strongly pushes up the handle, the handle is less likely to be deformed. Furthermore, when the user lifts up the print head by using the handle, the print head is less likely to wiggle and accordingly to accidentally come into contact with an external component. More specifically, the nozzle plate in the print head is less likely to wiggle and to accidentally come into contact with an external component. This configuration therefore successfully reduces the risk of the nozzle plate being damaged or scratched. It is consequently possible to reduce the risk of the print head discharging ink droplets at inaccurate locations, regardless of a size and weight of the print head.

At least a portion of the handle in the print head is aligned with the nozzle plate in a normal direction of the nozzle plate. Thus, by pulling up the handle with the print head kept in a substantially horizontal position, the print head can be lifted up with the nozzle plate kept in a substantially horizontal position, regardless of a size and weight of the print head. This structure successfully further reduces the risk of the nozzle plate accidentally coming into contact with an external component and being damaged or scratched. It is consequently possible to further reduce the risk of the print head discharging ink droplets at inaccurate locations, regardless of a size and weight of the print head.

According to a second aspect of the present disclosure, the liquid ejection surface in the above print head may have a first side and a second side, the second side being longer than and intersecting the first side as viewed from the normal direction. In addition, a length of the handle along the first side may be shorter than a length of the handle along the second side as viewed from the normal direction.

The handle in the print head may extend in a longitudinal direction of the print head. This structure enables a user to further stably lift up the print head by using the handle. In addition, the structure successfully further reduces the risk of the print head or the nozzle plate accidentally coming into contact with an external component and also the risk of the nozzle plate being damaged or scratched. It is consequently possible to further reduce the risk of the print head discharging ink droplets at inaccurate locations, regardless of a size and weight of the print head.

According to a third aspect of the present disclosure, the above print head may further include a drive circuit that outputs a drive signal for use in discharging the liquid through the nozzle aperture. In addition, at least a portion of the drive circuit may be positioned between the nozzle plate and the handle in the normal direction.

At least a portion of the drive circuit in the print head may be positioned between the nozzle plate and the handle in the normal direction. This structure enables the user to lift up the print head together with the drive circuit when a user replaces the print head with another, thereby achieving an efficient replacement process for the print head.

According to a fourth aspect of the present disclosure, the above print head may further include a cooling unit that cools down the drive circuit, the cooling unit being misaligned from the handle in the normal direction.

The cooling unit in the print head may be misaligned from the handle in the normal direction of the nizzle plates. This structure, when a user lifts up the print head by using the handle, successfully reduces the risk of the connector interfering with the user's operation, thereby enabling the user to further stably lift up the print head. It is consequently possible to further reduce the risk of the nozzle plate accidentally coming into contact with an external component and also the risk of the nozzle plate being damaged or scratched.

According to a fifth aspect of the present disclosure, the above print head may further include a connector to which a control signal for use in controlling an operation of the print head is to be input, the connector being misaligned from the handle in the normal direction.

The connector in the print head may be misaligned from the handle in the normal direction of the nozzle plate. This structure, when a user lifts up the print head by using the handle, successfully reduces the risk of the connector interfering with the user's operation, thereby enabling the user to further stably lift up the print head. It is consequently possible to further reduce the risk of the nozzle plate accidentally coming into contact with an external component and also the risk of the nozzle plate being damaged or scratched.

According to a sixth aspect of the present disclosure, the handle in the above print head may be configured to be held by both hands.

The handle in the above print head may be configured to be held by both hands. This structure enables a user to further stably lift up the print head, regardless of a size and weight of the print head. In addition, the structure successfully further reduces the risk of the nozzle plate accidentally coming into contact with an external component and also the risk of the nozzle plate being damaged or scratched. It is consequently possible to further reduce the risk of the print head discharging ink droplets at inaccurate locations.

According to a seventh aspect of the present disclosure, the above print head may have a weight of 5 kg or more.

Even if the print head has a weight of 5 kg or more, a user can stably lift up the print head. This structure successfully reduces the risk of the nozzle plate accidentally coming into contact with an external component and also the risk of the nozzle plate being damaged or scratched. It is consequently possible to further reduce the risk of the print head discharging ink droplets at inaccurate locations.

According to an eighth aspect of the present disclosure, the handle in the above print head may be made of a metal material.

Sine the handle in the print head is made of a metal material, the handle is less likely to be deformed. This structure enables a user to stably lift up the print head. In addition, the structure successfully reduces the risk of the nozzle plate accidentally coming into contact with an external component and also the risk of the nozzle plate being damaged or scratched. It is consequently possible to further reduce the risk of the print head discharging ink droplets at inaccurate locations.

According to a ninth aspect of the present disclosure, at least a portion of the handle in the above print head may be aligned with a center of the print head in the normal direction.

At least a portion of the handle in the print head may be aligned with a center of the print head in the normal direction of the nozzle plate. In this case, when a user lifts up the print head, the center of gravity of the print head is positioned near the handle. As a result, he/she can further stably lift up the print head by using the handle. This structure successfully further reduces the risk of the print head, especially the nozzle plate accidentally coming into contact with an external component and also the risk of the nozzle plate being damaged or scratched. It is consequently possible to further reduce the risk of the print head discharging ink droplets at inaccurate locations.

What is claimed is:

1. A print head that discharges a liquid, the print head comprising:

a nozzle plate in which a nozzle aperture which extends through the nozzle plate along a penetrating direction and through which the liquid is to be discharged in an ejection direction is formed, the nozzle plate being mounted on a liquid ejection surface;

an ejection control substrate on which an ejection control circuit that generates an ejection timing signal of the liquid from the nozzle aperture is mounted;

a housing that accommodates at least a portion of the nozzle plate and the ejection control substrate, the housing having a housing aperture opening along the penetrating direction of the nozzle aperture;

a handle positioned opposite the nozzle plate in the penetrating direction; and a connector which is mounted on the ejection control substrate, is attachable to a cable, and to which a control signal for controlling an operation of the print head is to be input via the cable, the connector being exposed via the housing aperture to an outside of the print head, the handle having a greater strength than that of the housing, at least a portion of the handle being aligned with the nozzle plate in a normal direction of the nozzle plate, which is along the penetrating direction, and the connector being misaligned from the handle in the normal direction.

2. The print head according to claim 1, wherein the liquid ejection surface has a first side and a second side, the second side being longer than and intersecting the first side as viewed from the normal direction, and a length of the handle along the first side is shorter than a length of the handle along the second side as viewed from the normal direction.

3. The print head according to claim 1, further comprising a drive circuit that outputs a drive signal for use in discharging the liquid through the nozzle aperture, wherein at least a portion of the drive circuit is positioned between the nozzle plate and the handle in the normal direction.

4. The print head according to claim 3, further comprising a cooling unit that cools down the drive circuit, the cooling unit being misaligned from the handle in the normal direction.

5. The print head according to claim 1, wherein the handle is configured to be held by both hands.

6. The print head according to claim 1, wherein the print head has a weight of 5 kg or more.

7. The print head according to claim 1, wherein the handle is made of a metal material.

8. The print head according to claim 1, wherein at least a portion of the handle is aligned with a center of the print head in the normal direction.

* * * * *